March 4, 1941.   J. ROBINSON   2,234,009
POWER TRANSMISSION
Filed April 3, 1939   2 Sheets-Sheet 1

INVENTOR
JAMES ROBINSON
BY
*Ralph L. Tweedale*
ATTORNEY

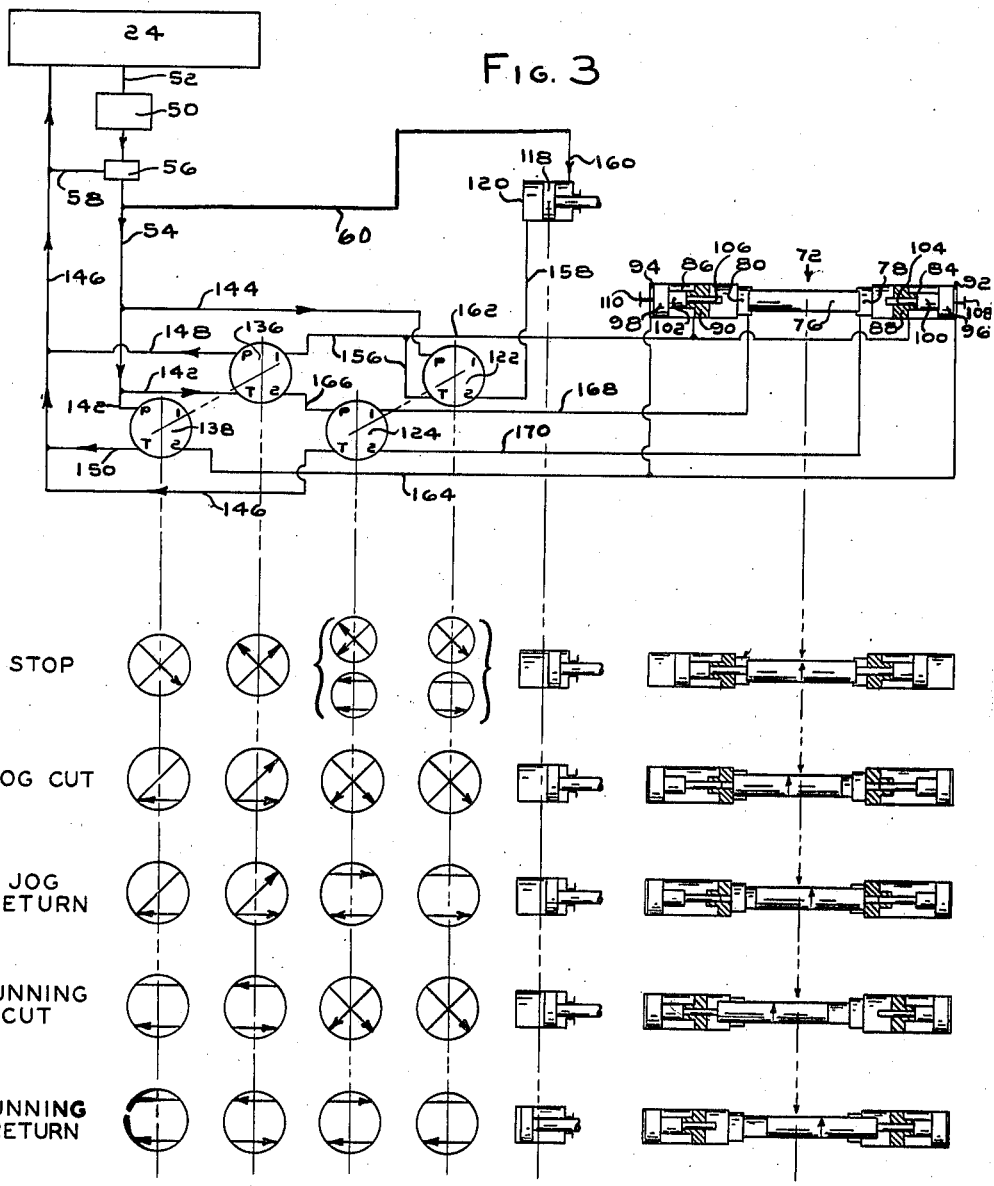

Patented Mar. 4, 1941

2,234,009

UNITED STATES PATENT OFFICE 2,234,009

POWER TRANSMISSION

James Robinson, Detroit, Mich., assignor to Vickers Incorporated, Detroit, Mich., a corporation of Michigan Application April 3, 1939, Serial No. 265,712

6 Claims. (Cl. 103—38)

This invention relates to power transmissions, particularly to those of the type comprising two or more fluid pressure energy translating devices, one of which may function as a pump and another as a fluid motor.

The invention is particularly concerned with a hydraulic power transmission system adapted for driving the reciprocating table of machine tools such as planers, shapers, etc., where a wide range of cutting speeds is required with high return speed, and also where it is necessary to provide for manual "jogging" of the table and for stopping the same.

It is an object of the present invention to provide an improved power transmission system adapted for this use and which incorporates a variable stroke pump together with a novel control mechanism for regulating the stroke of the pump in forward and reverse directions.

A further object is to provide a power transmission system of the character described wherein a variable displacement motor is utilized for providing rapid return speeds together with control means therefor which automatically maintains the motor in slow speed setting during "jogging" operations and during the stopped condition.

Further objects and advantages of the present invention will be apparent from the following description, reference being had to the accompanying drawings wherein a preferred form of the present invention is clearly shown.

In the drawings:

Figure 1 is a side view of a planer incorporating a preferred form of the present invention, a portion of the mechanism being cut away to illustrate the interior construction.

Figure 2 is a diagrammatic view of the hydraulic circuit incorporated in the mechanism of Figure 1.

Figure 3 is a chart of the elements of a hydraulic circuit and a table illustrating the flow conditions under various settings of the pilot valves.

Referring now to Figure 1, there is illustrated a planer embodying a base 10 on which is mounted a frame structure 12 forming a housing for the hydraulic mechanism. Suitably mounted on ways 14 on the frame 12 is a reciprocable table 16 adapted to carry a work piece such as 18 for reciprocating movement underneath a tool 20 carried by a horizontally and vertically adjustable tool holder 22. The elements of the planer itself are intended as illustrative only, it being understood that the invention may be applied to any machine tool or other mechanism requiring an alternately reciprocating drive.

Formed in the base 10 is an oil sump indicated at 24. Mounted on the base 10 is a prime mover, such as an electric motor 26, which is directly coupled to a variable displacement pump 28. The latter may be of any well-known suitable type and is illustrated as of the type shown in Thoma Patent No. 1,931,969. The pump 28 is connected by conduits 30 and 32 with a variable displacement hydraulic motor 34 which may be similar in construction to the pump 28. The motor 34 has its output shaft connected by a pinion 36 to a rack 38 secured to the table 16. Suitable relief valves 40 and 42 are provided in the conduits 30 and 32 respectively for bypassing oil from one conduit to the other through bypass connections 44 and 46 whenever the pressure in either line exceeds a predetermined maximum as determined by the setting of the relief valves.

Referring now to Figure 2 the motor 26 is adapted to drive, by means of a belt drive 48, an auxiliary pump 50 of any suitable construction. The latter has a suction conduit 52 connecting with the sump 24 and a delivery conduit 54 which carries a suitable relief valve 56 for bypassing oil to the tank through a conduit 58 whenever a predetermined pressure is exceeded in the line 54. The line 54 communicates by a branch 60 with a pair of check valves 62 and 64 which connect by conduits 66 and 68 with the main line conduits 30 and 32, thus providing for supercharging of the suction side of the main hydraulic circuit from the auxiliary pump 50.

The pump 28 is provided with a swinging yoke 70 for the purpose of controlling the rate and direction of the discharge of the pump. The position of the yoke 70 is controlled by a multiple fluid motor generally designated as 72. The latter comprises a stationary cylinder member 74 having a central small-diameter piston 76 acting in cylinder chambers 78 and 80. The piston 76 is connected to the yoke 70 by an operating arm 82. Adjacent the cylinder chambers 78 and 80 there are provided a pair of enlarged cylinder chambers 84 and 86 in which a pair of larger-diameter pistons 88 and 90 are mounted. Cylinders 84 and 86 are of such length that their respective pistons can never move the piston 76 completely into neutral position but stop at a position somewhat short of neutral providing for positioning the yoke 70 in either of two short-stroke positions.

To the right and left of the cylinder chambers 84 and 86 there are provided a second pair of chambers 92 and 94 which may be of the same diameter as the cylinders 84 and 86. Slidably mounted in the chambers 92 and 94 are a pair of pistons 96 and 98 having stems 100 and 102 adapted to abut the pistons 88 and 90 respectively. These stems are further provided with reduced portions 104 and 106 adapted to extend through central apertures in the pistons 88 and 90 and to abut the ends of the piston 76 when the pistons 96 and 98 are in the position illustrated. In this position also the stems 100 and 102 abut the pistons 88 and 90 which in turn are in abutting engagement with the end shoulders of the cylinder chambers 84 and 86. Adjustable screw stops 108 and 110 are provided in the ends of chambers 92 and 94 to variably limit the outward movement of pistons 96 and 98.

The motor 34 is provided with a swinging yoke 112 for the purpose of varying the displacement thereof. An adjustable stop screw 113 variably determines the maximum displacement position of yoke 112. The yoke is connected by a link 114 with a stem 116 of a piston 118 reciprocably carried in a stationary cylinder 120. The stroke of the piston 118 is such that the yoke 112 can never be moved beyond a certain fixed minimum displacement position.

For the purpose of controlling the position of the yokes 70 and 112 there is provided a pilot control circuit consisting of two pairs of four-way rotary pilot valves, the valves of each pair being mounted on a common operating stem. One such pair comprises valves 122 and 124 which have an operating handle 126 for manual positioning thereof and are further provided with a pair of trip levers 128 and 130. The lever 128 is positioned in a plane parallel to the plane of the paper which is behind the plane of the trip lever 130. These trip levers are positioned in the paths of adjustable trip dogs 132 and 134 mounted on the table 16 whereby the pilot valves 122 and 124 may be shifted at opposite ends of travel of the table 16 in the well-known manner. The other pair of pilot valves comprises valves 136 and 138 which are provided with a common operating handle 140 movable between the three positions illustrated in Figure 2.

Each of the valves is provided with four ports P, T, 1 and 2 positioned in multiples of twenty-two and one-half degrees around the circumference of the body. The plugs of the valves are provided with four equally spaced lands and with cross bores arranged to transpose the connections between ports P and T on the one hand and 1 and 2 on the other hand. The plugs of valves 136 and 138 are of the open-center type, that is, when the spool is in mid position, denoted as "jog" in Figure 2, ports 1 and 2 are connected together and also connected with port T while port P is isolated from all other ports. Valves of this character being well-known to those skilled in the art, further elaboration of their construction will be dispensed with.

From the auxiliary pump delivery conduit 54 a branch conduit 142 extends to the port P of valve 138 and the port T of valve 136. A second branch conduit 144 extends to the port P of valve 122. Tank conduit 146 connects by a branch 148 with port P of valve 136 and by a branch 150 with the port T of valve 138. The conduit 146 also connects to port T of valve 124. Branch conduits 152 and 154 connect to the ports D of valves 138 and 122 which serve as seepage drains for each pair of valves. Port 1 of valve 136 connects by a conduit 156 with port T of valve 122.

Port 1 of valve 122 is plugged while port 2 thereof connects by a conduit 158 with the head end of the cylinder 120. The rod end of the latter is connected to the auxiliary pump delivery conduit 54 by a branch 160. From conduit 156 a branch conduit 162 extends to the cylinder chambers 84 and 86 of motor 72. Port 2 of valve 138 connects by a conduit 164 with the cylinder chambers 92 and 94 of motor 72. Port 1 of valve 138 is plugged. Port 2 of valve 136 connects by a conduit 166 with port P of valve 124. Ports 1 and 2 of valve 124 connect by conduits 168 and 170 with the cylinder chambers 80 and 78 respectively.

In operation with the motor 26 running, the pumps 28 and 50 are driven at a constant speed, the pump 28 delivering oil to either conduit 30 or 32 depending upon the position of the yoke 70. In the neutral position illustrated, no oil is delivered to either conduit. When the yoke 70 is swung counter-clockwise, oil is delivered to the conduit 32 causing the motor 34 to turn in the direction indicated by the arrow driving the table 16 to the left on the cutting stroke. The speed of the table depends upon two factors, first, the angle of tilt of the yoke 70, the speed increasing with increasing angles of tilt, and second, the angle of tilt of the yoke 112, the speed decreasing with increasing angles of tilt. In other words, the yoke 112 is shown in Figure 2 in the slow speed position. If the yoke 70 be swung counter-clockwise away from neutral position, oil is delivered to the conduit 32 causing the motor 34 to rotate in the direction indicated and operating the table on a cutting stroke.

The operation of the pilot circuit for controlling the position of yokes 70 and 112 may best be understood from Figure 3 the upper portion of which represents a simplified chart of the pilot circuit and the motors 72 and 118—120. In this portion of the chart the pilot valves 122, 124, 136 and 138 are represented as circles, the four ports being connectable either cross-wise or parallel as shown in the circles in the lower portion of the chart.

If we consider now the conditions shown in the line marked "Stop" in the lower portion of the chart, it will be seen that pilot pressure from conduit 54 is admitted through conduit 142, ports P and 2 of valve 138, and conduit 164 to the chambers 92 and 94. The pistons 96 and 98 are accordingly moved inwardly, the stems 100 and 102 carrying the pistons 88 and 90 up against the ends of chambers 84 and 86. The stems 104 and 106 also abut piston 76 maintaining the latter in neutral position. Pilot pressure from conduit 54 is also conducted through conduit 142, ports T and 1 of valve 136, conduits 156 and 162, to chambers 84 and 86. This reacts on the outer faces of pistons 88 and 90 and on the inner faces of pistons 96 and 98 but over an area smaller than the outer faces thereof. Pilot pressure is also maintained in cylinder 120 holding the yoke 112 on slow speed position. This is true regardless of the position of valve 122 since if the latter is in the cross-connection position, pilot pressure flows in from conduits 54 and 144 through ports P and 2 and conduit 158. If the valve 122 is in its parallel-connection position, pilot pressure flows in from conduit 156 through ports T and 2 and conduit 158. The chambers 78 and 80 are connected to tank at all times regardless of the position of valve 124. Since port T thereof is connected to tank by conduit 146 and port P thereof is connected to tank through conduit 166, ports 2 and P of valve 136 and conduit 148. Thus the yoke 70 is maintained in neutral position.

Referring to the next line of the lower portion of the chart which illustrates the condition when the handle 140 is shifted to "jog" position and when the handle 126 is in the cutting position, ports T, 1 and 2 of valves 136 and 138 are all connected together since the "jog" position is the open-center condition. Pilot pressure is thus admitted from conduits 54 and 142 through ports T and 2 of valve 136, conduit 166, ports P and 2 of valve 124, and conduit 170 to chamber 78, thus urging piston 76 to the left. Oil is discharged from chamber 80 through conduit 168, ports 1 and T of valve 124 and conduit 146 to tank. Pilot pressure is also admitted from port T of valve 136 to port 1 thereof and through conduits 156 and 162 to the chambers 84 and 86. Pistons 88 and 90 are accordingly maintained against the inner ends of their cylinder chambers, and since the piston 90 has a greater area than the piston 76, the former acts as a limit stop preventing the leftward travel of piston 76 beyond a minimum stroke position suitable for "jogging" speed of the table 16. Chambers 92 and 94 are connected to tank through conduit 164, ports 2 and T of valve 138, and conduits 150 and 146, thus permitting pistons 96 and 98 to move outwardly against their stops 108 and 110. It will be noted that in the maximum outward position the stems 104 and 106 do not completely leave the central bores of the pistons 88 and 90. Otherwise pressure oil from chamber 86 would be permitted to bypass into chamber 80 and through conduit 168, ports 1 and T of valve 124 and conduit 146 to tank. Pilot pressure is also maintained in cylinder 120 to hold yoke 112 in slow speed position, it being admitted from conduit 144, through ports P and 2 of valve 122 to conduit 158.

The "jogging" return position illustrated on the next line of the lower portion of the chart is the same as that previously described except that valves 122 and 124 are reversed, causing the piston 76 to shift to minimum stroke position on the return side of neutral as will be clear from the chart. Pressure is maintained in cylinder 120 during these conditions by the connection from conduit 142, through ports T and 1 of valve 136, conduit 156, and ports T and 2 of valve 122 to conduit 158.

The next line of the charts illustrates the conditions when handle 140 has been shifted to the "run" position, valves 122 and 124 being in the cutting position. The only change over the condition of "jogging" cut thereby established is that the chambers 84 and 86 are connected to tank through conduits 162 and 156, ports 1 and P of valve 136 and conduits 148 and 146. This accordingly permits piston 76 to move fully to the left carrying piston 90 with it until the latter abuts stem 102 of piston 98.

The last line illustrates the conditions when the valves 122 and 124 are shifted to the "return" position. Under these conditions the chambers 78 and 80 are transposed so that chamber 80 is connected to pilot pressure from conduit 142, through ports T and 2 of valve 136, conduit 166, ports P and 1 of valve 124, and conduit 168. Chambers 84, 86, 92 and 94 remain connected to tank as before. Cylinder 120, however, is also connected to tank in this position through conduit 158, ports 2 and T of valve 122, conduit 156, ports 1 and P of valve 136, and conduits 148. Pressure admitted through conduit 160 to the rod end of cylinder 120 moves the piston 118 to the left bringing yoke 112 into its minimum stroke position, thus causing the return stroke to take place at higher speed.

During normal running operation the dogs 132 and 134 alternately contact the levers 128 and 130, shifting the valves 122 and 124 between cutting and returning positions at the end of the respective strokes of the table 16. There is thus provided a control system which, acting through the unitary multiple piston motor 72 and through the motor displacement regulator 118—120, provides for stopping of the table, for manually operating the same at low speed to produce "jogging" movement, or for automatic continuously-repeating cycles of cutting and high-speed returning strokes. The stop screws 108, 110 and 114 provide for independent adjustments of cutting and return speeds.

While the form of embodiment of the invention as herein disclosed constitutes a preferred form, it is to be understood that other forms might be adopted, all coming within the scope of the claims which follow.

What is claimed is as follows:

1. In a hydraulic power transmission system the combination of a variable displacement pump, a member movable to vary the pump displacement, a first piston motor for operating said member through its full stroke, a second piston motor opposing the first piston motor and operable to limit the stroke of said member to a smaller range, a third piston motor opposing the first piston motor and operable to hold said member in neutral, a first pilot valve means movable between a forward and a reverse position for selectively supplying fluid to the first piston motor in either direction to control the direction of delivery of fluid by the pump, and a second pilot valve means movable between three positions to control the supply of fluid to all three piston motors to respectively position said member at neutral, limited stroke or full stroke for stopping, jogging or running the fluid motor.

2. In a hydraulic power transmission system the combination of a variable displacement pump, a member movable to vary the pump displacement, a first piston motor for operating said member through its full stroke, a second piston motor opposing the first piston motor and operable to limit the stroke of said member to a smaller range, a third piston motor opposing the first piston motor and operable to hold said member in neutral, said piston motors being mounted in axial alignment and having their pistons in abutting relationship, a first pilot valve means movable between a forward and a reverse position for selectively supplying fluid to the first piston motor in either direction to control the direction of delivery of fluid by the pump, and a second pilot valve means movable between three positions to control the supply of fluid to all three piston motors to respectively position said member at neutral, limited stroke or full stroke for stopping, jogging or running the fluid motor.

3. In a hydraulic power transmission system the combination of a variable displacement pump, a member movable to vary the pump displacement, a first piston motor for operating said member through its full stroke, a second piston motor opposing the first piston motor and operable to limit the stroke of said member to a smaller range, a third piston motor opposing the first piston motor and operable to hold said member in neutral, said piston motors being mounted in axial alignment in a continuous cylindrical chamber having portions of differing diameters and having their pistons of different effective areas and in abutting relationship, and pilot valve means for controlling the supply of fluid to said piston motors selectively.

4. A regulator for a variable displacement pump comprising a member movable to vary the pump displacement, a first piston motor for operating said member through its full stroke, a second piston motor opposing the first piston motor and operable to limit the stroke of said member to a smaller range, a third piston motor opposing the first piston motor and operable to hold said member in neutral, said piston motors being mounted in axial alignment and having their pistons in abutting relationship, a first pilot valve means movable between a forward and a reverse position for selectively supplying fluid to the first piston motor in either direction to control the direction of delivery of fluid by the pump, and a second pilot valve means movable between three positions to control the supply of fluid to all three piston motors to respectively position said member at neutral, limited stroke or full stroke.

5. A fluid motor for selectively positioning a member in any one of five different positions comprising a pair of oppositely facing cylindrical chambers each having a small diameter portion and a large diameter portion, ram means slidable in said small diameter portions from one extreme position to the other and connected with said member, second ram means slidable in said large diameter portions between each extreme position and a less extreme position and arranged to abut the first ram means, and third ram means also slidable in the large diameter portion between each extreme position and an intermediate position and arranged to abut the first and second ram means.

6. A fluid motor for selectively positioning a member in any one of five different positions comprising a pair of oppositely facing cylindrical chambers each having a small diameter portion and a large diameter portion, ram means slidable in said small diameter portions from one extreme position to the other and connected with said member, second ram means slidable in said large diameter portions between each extreme position and a less extreme position and arranged to abut the first ram means, and third ram means also slidable in the large diameter portion between each extreme position and an intermediate position and arranged to abut the first and second ram means, said second ram means having a bore therethrough and said third ram means having a portion slidably engaged in said bore and extendable through the second ram means.

JAMES ROBINSON.